United States Patent Office 3,182,356
Patented May 11, 1965

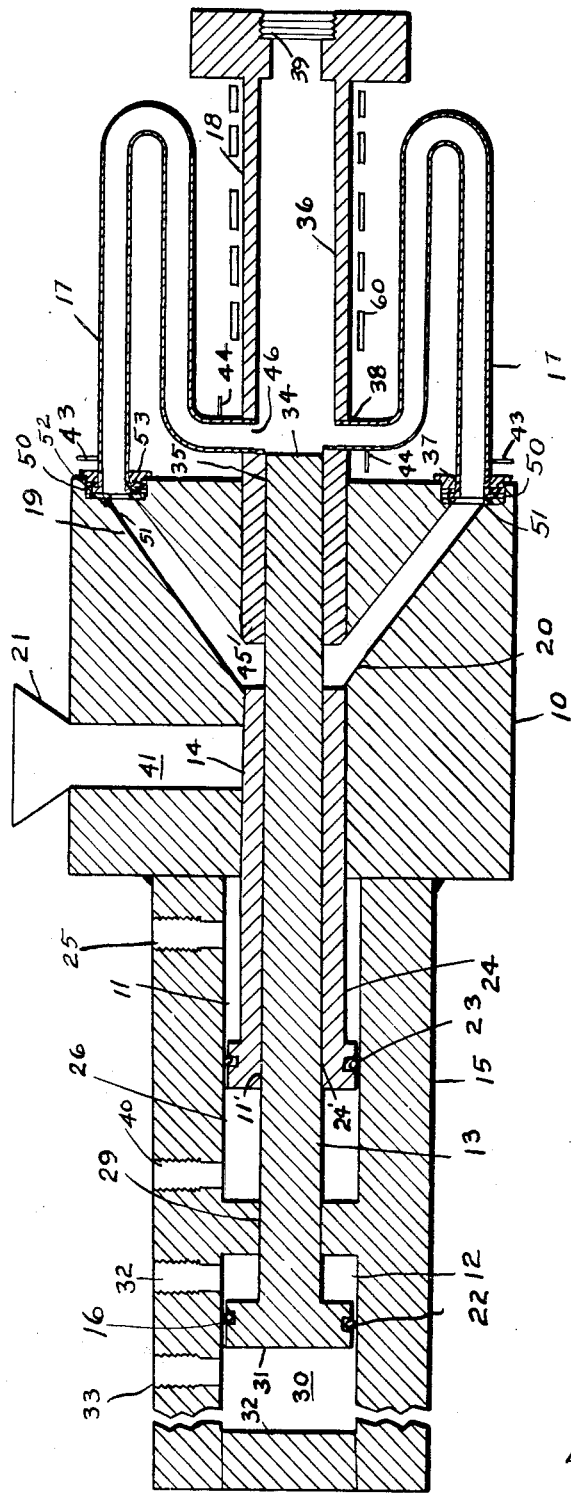

3,182,356
PLASTIC HEATING DEVICE
Henry J. Witkowski, 561 E. 18th St., Erie, Pa.
Continuation of application Ser. No. 77,663, Dec. 22, 1960. This application June 5, 1963, Ser. No. 285,821
7 Claims. (Cl. 18—30)

This invention relates to injection molding machines and, more particularly, to machines for injecting melted plastic material at high temperatures and at high pressures into molds.

This application is a continuation of patent application, Serial No. 77,663, filed December 22, 1960 now abandoned.

Prior injection molding machines have required a considerable amount of heat to raise the temperature of the heating cylinder itself and, subsequently, to reheat it between the shots of plastic. This requires considerable waste heat in cooling the material of the cylinder. Consequently, a great deal of heat is lost to the cylinder and to the die and only a small part of the heat supplied is transmitted to the material to be melted. Further, in the machines presently available, in order to properly melt the plastic material, it is necessary to raise the temperature of the entire mass of the heating cylinder to a high elevation in order to have the proper heat gradient to transfer the heat through the heavy metal walls to the plastic in the short time available.

The present invention comprises an improvement over Patent No. 2,616,130 in that a bypass is provided by way of tubes, the walls of which actually conduct electricity to heat the tubes and conduct plastic from a source of unmelted plastic which is melted as it passes through the tubes and is discharged into a die. This eliminates the necessity of driving heat from an external source through the body of the device and thence into the plastic. The thermal inertia of the present device is reduced and electrical power is conserved.

It is, accordingly, an object of the present invention to provide an improved injection molding heating device.

Another object of the invention is to provide a heating device for an injection molding machine wherein the heating device and the injection portion thereof operate as a unit.

Still another object of the invention is to provide an improved combination injection and heating device for a molding machine.

A further object of the invention is to provide a heater for injection molding machines wherein the channel carrying the plastic through the heater itself acts as a conductor for electricity.

Still a further object of the invention is to provide a heating device for an injection molding machine which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

The figure of drawing is a longitudinal cross sectional view of a heating device according to the invention.

Now with more particular reference to the drawing, the heating device is shown having a body 10 with a cylindrical bore 11 therein. The bore 11 communicates with a passage 35. The cylindrical bore 11 has an outer piston 14 which slides therein and fits snugly inside a bore 11'. The outer piston 14 has a cylindrical portion 24 thereon which forms a chamber which communicates with an opening 25 into which is injected fluid under pressure. Pressure of fluid through the opening 25 moves the piston 14 backwards away from a nozzle end 39.

An annular groove receives an O-shaped washer 23 which forms a piston ring to seal and prevent the fluid under pressure in a chamber 26 and in the chamber defined by the cylindrical portion 24 from leaking past into the chamber 26 or vice versa.

An inner piston 13 is slidably received inside a bore 24' in the cylinder. The inner piston 13 is cylindrical with a head 31 on one end thereof. The piston 13 also slides in an opening 29 in an outer body 15. A chamber 30 is formed in the outer body 15 between a head 31 of the inner cylinder. A closure 32 closes the outer end of the cylinder formed by the body 15 and forms a closure for the end of the outer cylinder.

A source of fluid under pressure is connected to the chamber 30 through an opening 33 and a similar source of fluid under pressure is connected to the closure 32. Therefore, the inner piston can be moved backwards and forwards by controlling the pressure of fluid entering the members 32 and 33. An O-shaped washer 16 is received in an annular groove in the head in the inner cylinder and it acts as a piston ring on the piston formed by the head 31 in the outer cylinder.

The inner piston 13 extends through the bore in the outer piston 14 and is slidingly received therein and concentric thereto. An end 34 of the inner piston moves through the passage 35 to force plastic material which has been forced into a discharge tube 36 into a die connected at the end 39.

A tubing 17 which may be made of stainless steel or some other material having a relatively high electrical resistance is connected at 37 to the body and at 38 to the discharge tube 36. A suitable nozzle may be connected at the end 39 to connect the device to a molding die. The connection 37 is made by providing a counterbore 50 with an insulating washer 51. The ends of the tubing 17 are flared at 52 and the end of the flare rests on the washer 51. The washers 51 are fitted over the tubing 17 inwardly of the flare and threaded plugs 53 threadably engage the washers 51. Thus, one end of each tube 17 is electrically insulated from the body 10. Electricity can be connected to the body 10 and to terminals 43 and 44 to cause current to flow therethrough.

A hopper type feeder 21 is provided to supply granular plastic material to the cylinder and it communicates with an injection space 20 by way of a passage 41.

In operation, the body 10 of the cylinder may be supported on a suitable molding machine and a nozzle attached to the end 39 may be connected to a die having a cavity which is in the form of the article to be molded. Plastic granular material is supplied to the feeder 21 and fluid under pressure is supplied to the closure 32 and the opening 25. This will cause both pistons 13 and 14 to retract, allowing the passage 41 to communicate with the injection space 20.

When the granular material has filled the space 20, the pressure will be relieved on the fluid in the opening 25 and admitted to an opening 40. This will cause the outer piston 14 to move to the position shown, closing the opening 40, driving plastic material into the tubes 17, and applying a force thereto in the inner injection space 20. Fluid under pressure can then be admitted to the opening 33 to advance the inner piston 13 toward the threaded nozzle end 39. Since the area of the end 34 of the inner piston 13 is much less than the corresponding area of the piston 14, a greater pressure will be applied to the material by the piston 13 and the material will be forced from the tube 36 into the die connected to the nozzle end 39 at high pressures.

By suitably controlling the timing and the pressure of fluid into the openings 25, 32, 33, and 40, the plastic material can be injected into the cylinder at a rapid rate. Because heat will be applied directly to the tubes 17, they will be heated at a rapid rate. Heat can be supplied to the tubes 17 and to the discharge tube 36 by external heating bands 60. Electricity can be driven through the tubes themselves directly and thereby heat the tubes directly.

Bores 19 in the body will communicate with the space 20 and one end of the tube 17 and, thus, granular material will be fed into the tubes and melted therein.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows.

We claim:
1. A heater for an injection molding machine comprising
   a hollow body,
   an outlet,
   a plurality of hollow, relatively thin tubes connecting said hollow body to said outlet,
   said tubes being made of electrically conductive, relatively high electrical resistance material adapted to engage plastic material flowing therethrough,
   means to connect a supply of etecirical power to said tubes providing a circuit whereby electrical power may flow through said electrically conductive material of said tubes and heats said tubes, providing a source of heat directly within the material of said tubes themselves for plastic therein,
   and means to force plastic through said body and through said tubes.
2. In combination, an injection molding machine and a heater connected thereto,
   said heater comprising a hollow body,
   an outlet,
   a plurality of hollow, relatively thin tubes connecting said hollow body to said outlet,
   said tubes being made of electrically conductive, relatively high electrical resistance material,
   means to connect a supply of electrical power to said tubes providing a circuit whereby electrical power may flow through said electrically conductive material of said tubes and heats said tubes, providing a source of heat generally directly in said material of said tubes themselves for plastic material therein,
   and means to force plastic material through said body and through said tubes.
3. The heater recited in claim 1 wherein said tubes are made of stainless steel.
4. A device comprising
   a body, a hollow cylindrical cavity in said body,
   a discharge tube connected to the hollow of said body, an outer piston slidably received in said cavity,
   an injection space in said body ahead of said outer piston,
   an inner piston extending through said outer piston and concentric therewith,
   heating tubes connecting said injection space to said discharge tube,
   said heating tubes being made of electrical conductive material,
   means to connect a source of electricity to said heating tubes to cause a flow of electricity therethrough,
   means to retract and to advance said inner piston and said outer piston independent of each other,
   and means communicating with the inside of said cavity to feed unmelted plastic material into said injection space ahead of said outer piston whereby said plastic material can be forced through said heating tubes into said discharge tube ahead of said inner piston,
   said means to retract and advance said pistons being adapted to force said outer piston forward to close the entrance of said feeding means,
   said inner piston being adapted to move forward into said discharge tube to force said plastic material from said discharge tube into a die.
5. The device recited in claim 4 wherein said heating tubes have one end thereof electrically insulated from said body and said heating tubes are adapted to conduct electricity directly therethrough to heat said plastic material.
6. An injection molding machine comprising a body including a discharge tube on one end thereof,
   a first bore extending through said body defining a cylindrical passage therethrough and terminating at said discharge tube,
   said first bore having an outer piston slidably received therein,
   an inner piston in said first bore,
   one end of said inner piston extending through a second bore in said outer piston and concentrically disposed therein,
   a feeding means,
   a first lateral opening in said body communicating with the inside of said first bore,
   said outer piston movable in said first bore in said body toward said discharge tube away from said first opening to allow material to be fed into said first bore in said body and movable to close said first opening to trap plastic material in said first bore in said body,
   axially spaced openings in said body between said first opening and said discharge tube communicating with the inside of said first bore in said body,
   heating tubes made of heat conductive material connecting said axially spaced openings,
   said heating tubes comprising spaced electrical terminals connected to said tubes to melt plastic material therein,
   said inner piston closing the space in said first bore in said body between said axially spaced openings, and said outer piston adapted to force plastic material through said tubes,
   said inner piston being adatped to force plastic material through said discharge tube to an outlet thereon.
7. The machine recited in claim 6 wherein means is provided on said machine for moving said pistons independent of each other.

References Cited by the Examiner
UNITED STATES PATENTS
2,961,706  11/60  Sevenson _____ 18—30

FOREIGN PATENTS
501,277  2/39  Great Britain.

MICHAEL V. BRINDISI, *Primary Examiner.*